United States Patent [19]

Slavin et al.

[11] Patent Number: 4,758,811
[45] Date of Patent: Jul. 19, 1988

[54] BISTABLE SOLENOID ACTUATOR

[75] Inventors: Michael Slavin; Charles Martus, both of Troy, Mich.

[73] Assignee: Lectron Products, Inc., Rochester Hills, Mich.

[21] Appl. No.: 14,823

[22] Filed: Feb. 13, 1987

[51] Int. Cl.$^4$ ............................................. H01F 7/08
[52] U.S. Cl. ..................................... 335/234; 335/230
[58] Field of Search ................. 335/229, 230, 234, 78, 335/79

[56] References Cited

U.S. PATENT DOCUMENTS

| 4,383,234 | 5/1983 | Yatsushiro et al. | 335/234 X |
| 4,462,013 | 7/1984 | Ueda et al. | 335/234 X |
| 4,660,012 | 4/1987 | Bonniau et al. | 335/234 |
| 4,683,452 | 7/1987 | Henley | 335/234 |

OTHER PUBLICATIONS

Dennis Jaisle, "Electrical Solenoids Move Into New Areas", *Design News*, pp. 52–54, 56, and 59–60, May 21, 1984.

*Primary Examiner*—George Harris
*Attorney, Agent, or Firm*—Harness, Dickey & Pierce

[57] ABSTRACT

A bistable actuating solenoid device having an axially translatable armature which is stable at either a first or a second position. The device employs a solenoid winding wrapped around a bobbin having an internal bore with the armature disposed in the bore. A permanent magnet is located at one end of the bobbin for holding the armature in the first position and a spring urges the armature toward the second position. When it is desired to move the armature from the first to the second position, a current is passed through the winding such that a magnetic field is generated which opposes the field presented by the permanent magnet to allow the armature to move to the second position under the influence of the spring. When it is desired to return the armature to the first position, a current is passed through the winding in a direction which generates a field which combines with that of the permanent magnet to attract the armature to the first position against the biasing force of the spring. The armature thereafter remains in the first position due to the attraction force of the permanent magnet.

23 Claims, 2 Drawing Sheets

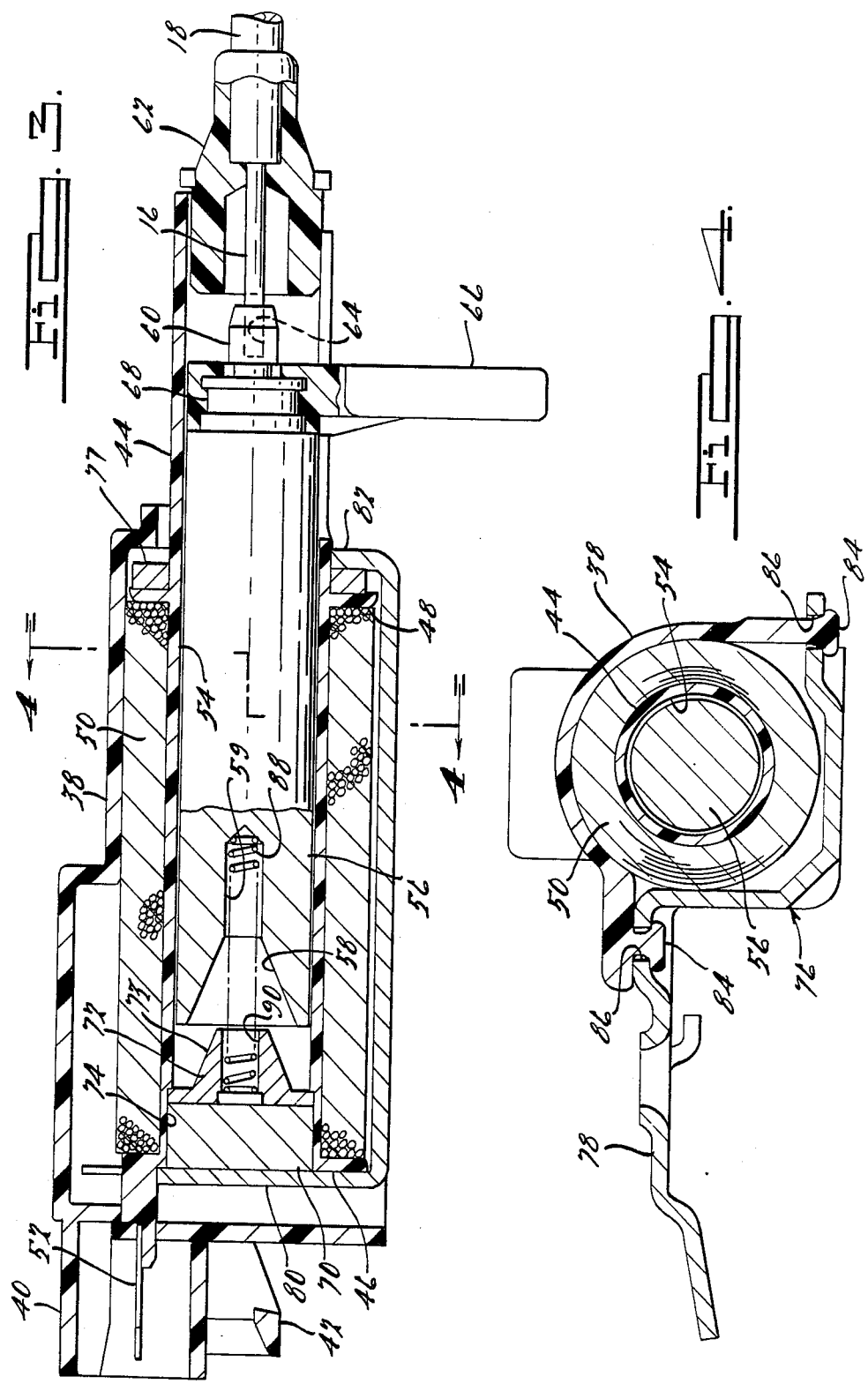

BISTABLE SOLENOID ACTUATOR

BACKGROUND OF THE INVENTION

This invention relates to a solenoid actuator and particularly to one that has an axially movable armature having two stable operating positions.

Modern motor vehicles include numerous features and conveniences for enhanced occupant comfort, convenience, and security. One such feature is the provision of a lockable fuel filler door. Many passenger cars have a hinged filler door in the rear quarter panel or rear trunk area which encloses the fuel tank filler cap. As a means of preventing theft of fuel or the introduction of contaminants into the tank, many cars are equipped with a fuel filler door that is lockable. One type of lockable filler door has its own key and tumbler locking mechanism. This type requires the use of a key to unlock the filler door in order to fill the fuel tank. As a means of providing a more convenient lockable fuel filler door, various approaches for coordinating the locking of the vehicle doors with the fuel filler tank have been devised. One such system uses a small electric motor which operates remotely through a flexible cable to move a filler door latch between locked and unlocked positions. Remote mounting of the actuation motor is used to simplify installation of the actuator and to avoid the presentation of electrical sparks near flammable vapors vented from the fuel tank. Although such devices operate satisfactorily, there is a continuing desire to reduce their cost and enhance their performance.

Although solenoid type actuators inherently have an advantage over electric motors in terms of cost and simplicity, they have the inherent disadvantage that their axially movable armature is ordinarily stable in only one operating position. In order to maintain the solenoid armature at a position displaced from its stable position, a constant current flow is ordinarily required. In motor vehicle applications, it is desirable to minimize electrical current demand to reduce alternator loads, and further, to prevent battery depletion when the vehicle is not being operated. Accordingly, there is a need for a solenoid operated actuator which has a movable armature with two stable positions which do not require current flow except during periods wherein the state of the solenoid is being changed.

SUMMARY OF THE INVENTION

In accordance with the present invention, a bistable actuating solenoid having the above-described desirable features is provided. The solenoid device employs a solenoid coil surrounding an axially movable armature. A permanent magnet is positioned at one end of the solenoid and is capable of maintaining the armature in one of the actuated positions. When it is desired to move the solenoid armature away from the permanent magnet, electrical current is passed through the solenoid coil in a direction such that the solenoid generates a magnetic field which temporarily neutralizes the magnetic field presented by the permanent magnet, thus allowing the armature to be moved under the influence of spring biasing. The armature remains in this position since the magnetic field strength of the permanent magnet and pole piece, and the gap between the components and the armature do not provide a sufficient attraction force to overcome the spring biasing force. When it is desired to return the armature to the first mentioned position, a current is passed through the solenoid coil in the direction which generates a magnetic field which reinforces the field provided by the permanent magnet, thus attracting the armature to the permanent magnet. When the current flow is stopped, the armature remains in position adjacent the permanent magnet opposing the spring tension force. Accordingly, the solenoid armature has two stable operational positions and is therefore an electro-mechanical equivalent to a simple digital electronic flip-flop gate. Although such an actuator would have numerous uses, it is disclosed herein as being used to move a motor vehicle gas door latch between locked and unlocked positions through a cable.

Additional benefits and advantages of the present invention will become apparent to those skilled in the art to which this invention relates from the subsequent description of the preferred embodiments and the appended claims taken in conjunction with the accompanying drawings.

BRIEF DESCRIPTION OF THE DRAWINGS

FIG. 3 is a longitudinal cross-sectional view of the bistable actuating solenoid in accordance with this invention showing the armature in one stable position; and FIG. 4 is a cross-sectional view taken along line 4—4 of FIG. 3.

DETAILED DESCRIPTION OF THE INVENTION

Figure 1:
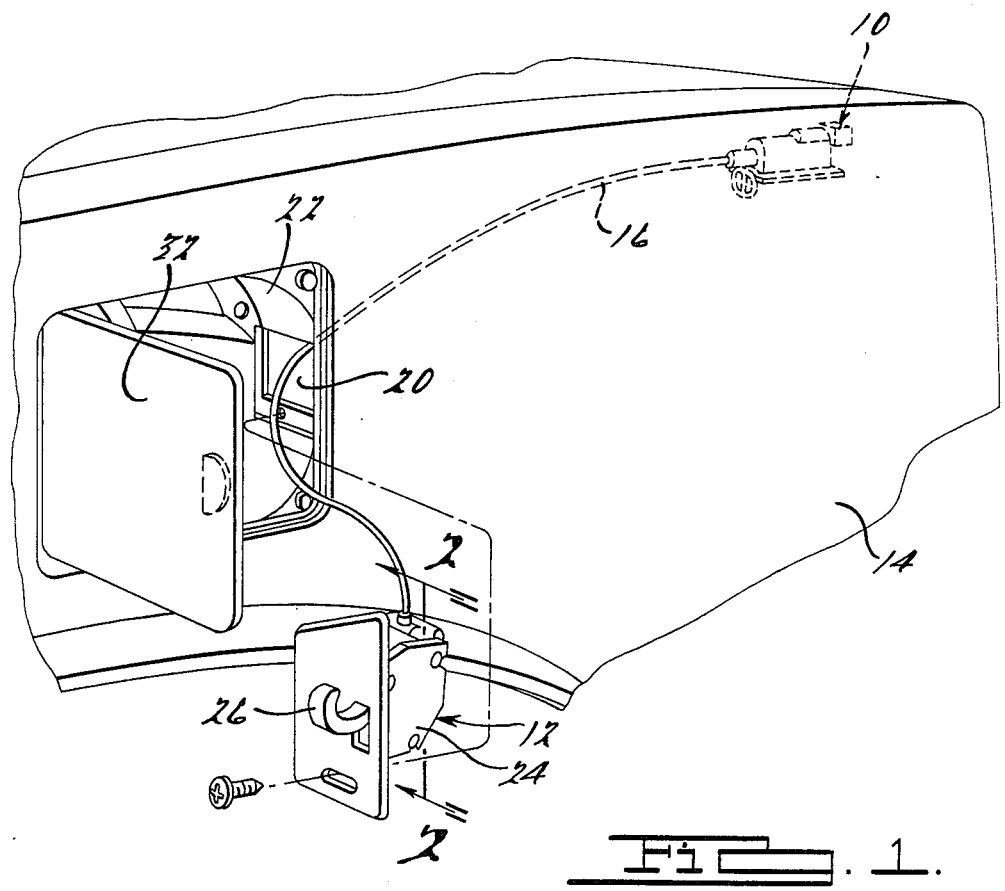
FIG. 1 is a pictorial view of the bistable actuating solenoid in accordance with this invention installed within the rear quarter panel of a passenger car and communicating to a gas door latching device through a flexible cable.

FIG. 1 illustrates a bistable actuating solenoid according to this invention which is generally designated by reference number 10 being used to actuate a gas door locking mechanism 12. The actuating solenoid 10 is fixedly mounted within the rear quarter panel 14 of a motor vehicle. The solenoid 10 linearly actuates the control cable 16 enclosed within a sheath 18. Locking mechanism 12 is mounted within an aperture 20 inside the gas filler compartment 22.

Figure 2:
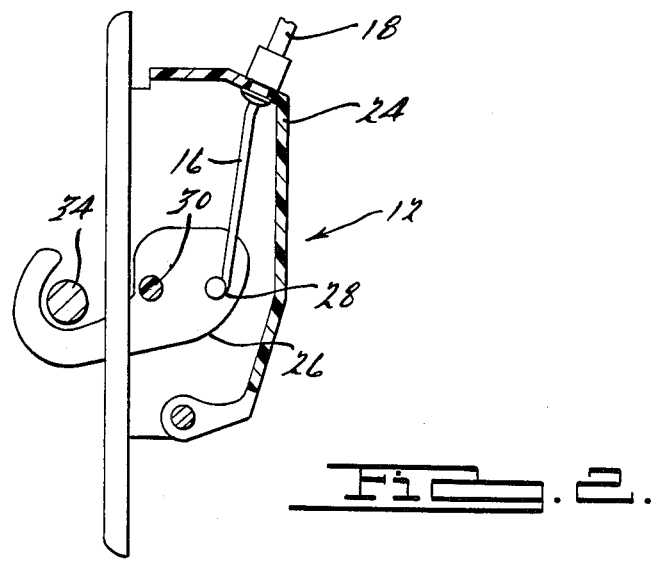
FIG. 2 is a cross-sectional view taken along lines 2—2 of FIG. 1 showing the internal details of the latching mechanism according to this invention.

The details of the operating mechanisms of the locking mechanism 12 are best described with reference to FIG. 2. The sheath 18 is affixed to the locking mechanism frame 24. The cable 16 is affixed to a lock dog 26 by a pin 28. The lock dog 26 is rotatable about a pin 30 in response to movement of the cable 16 to move between the locked position shown in FIG. 2, and the unlocked position wherein the lock dog is rotated counterclockwise due to withdrawal of the cable 16. In the unlocked position, the gas filler door 32 can be opened since the lock dog 26 is moved out of engagement with the locking bar 34. As an alternate configuration, the cable 16 could have a ferrule which is loosely captured by the lock dog 26 so that they are coupled only in response to tension in the cable. For such a design, spring means would be provided to bias the lock dog 26 toward a locking position thus enabling it to return to that position when tension in the cable is relieved.

The components making up the actuating solenoid 10 are described with reference to FIG. 3. The housing 38 is preferably made from a polymeric plastic and defines an electrical connector socket 40. A lug 42 is provided for interlockingly connecting an associated electrical connector within the socket 40. The bobbin 44 has an axial length which is greater than that of the housing 38 such that it protrudes therefrom at one end. The bobbin 44 defines separated radially projecting flanges 46 and 48 which establish the axial length of the solenoid winding 50. The ends of the wire making up the solenoid winding 50 are electrically connected to a pair of terminals 52 (only one visible in FIG. 3). A circuit breaker or another type of circuit protection means may be electrically connected to either of the terminals 52. The bobbin 44 has an elongated inside cylindrical bore 54. The armature 56 is an elongated cylindrical member dimensioned to be slidable within the bore 54. The armature 56 has a conical bore 58 at one end thereof which converges into blind bore 59 and a cable socket end 60 at its other axial end.

A sheath end 62 is disposed within the protruding end of the bobbin 44 and supports the cable sheath 18. The cable 16, which protrudes from the sheath 18, enters the cable bore 64 within the armature cable socket end 60. The cable 16 is secured within the bore 64 by crimping the armature cable socket end 60 against the cable. Linear motion of the armature 56 causes the cable 16 to be inserted into and withdrawn from the sheath 18. The manual override handle 66 engages an annular groove 68 of the armature 56 and enables the armature to be manually moved between positions in the event of an electrical failure or other malfunction which disables the device from moving to its unlocked position.

The permanent magnet 70 is fixedly disposed within the bore 54. The pole piece 72 is mounted in contact with the permanent magnet 70 and defines a conical surface 73 which conforms with the conical bore 58 of the armature. The permanent magnet 70 and the pole piece 72 are positioned within the bore portion 74 which is slightly larger in diameter than the remainder of the bore 54. A coil spring 88 is disposed in the bores 90 and 59 of the pole piece 72 and the armature 56, respectively, to bias the armature away from the pole piece. The flux collector 77 has an annular configuration and is disposed around the bobbin 44 against the flange 48.

The solenoid frame 76 is formed from sheet metal stock and includes a mounting plate 78 for attaching the solenoid 10 to an associated structure. The frame 76 further includes a pair of upstanding tabs 80 and 82. The tab 80 is positioned to closely fit against the permanent magnet 70, and the tab 82 has a central slot so that it generally surrounds the bobbin 44 adjacent the flux collector 77. The tabs 80 and 82 provide a conduction path for the magnetic circuit of the solenoid 10.

The manner of attachment of the housing 38 with the frame 76 is best shown with reference to FIG. 4. The housing 38 has several projecting lugs 84 which fit within corresponding slots 86 of the frame. After combining these parts, the lugs 84 are heated (preferably by heated air) to cause the housing 38 to interlock with the frame 76.

Operation of the actuating solenoid 10 will now be explained with particular reference to FIG. 3. The armature 56 is shown in its rightmost position in FIG. 3 which corresponds to a position wherein the gas door 32 is locked. The armature 56 remains in this position without external force inputs through the biasing force provided by the spring 88. When it is desired to move the armature 56 to the left unlocked position, a voltage is applied to terminals 52 which causes a current flow within solenoid winding 50 in a direction which causes a magnetic field to be generated having a sense such that it combines with the field presented by the permanent magnet 70. The poles presented in this manner create opposing poles to exist on the surfaces of the pole piece 72 and the armature 56 at their interface causing the armature to be moved toward the pole piece. The conical bore 58 and the conical configuration of the pole piece surface 73 enhance the attraction force between these two components at large separation distances in a manner well known to those trained in this art. Once the armature 56 is moved to the leftmost position, current flow through winding 50 may be stopped. In this position, the magnetic field from the permanent magnet 70 maintains the armature 56 in the leftmost position which unlocks the gas filler door 32. Since the gap between the armature 56 and the pole piece 72 is small when the armature 56 is in that position, the magnetic field of the permanent magnet 70 creates a high attraction force sufficient to hold the armature against the biasing force exerted by the spring 88.

When it is desired to return the armature 56 to the rightmost position which locks the gas filler door 32, a DC current is applied to terminals 52 in a manner which presents a magnetic polar orientation opposite that previously described, such that the field is opposite in direction than the field presented by the permanent magnet 70. Due to the inductance of the winding 50, the current through the winding, and consequently, the generated magnetic field increases over time. During the building of such magnetic field, the attractive force between the armature 56 and the pole piece 72 is neutralized and the armature 56 is permitted to move to its rightmost position under the influence of the spring 88. Preferably, the flux intensity provided by the winding 50 which opposes the magnetic field of the permanent magnet 70 in this operational condition is designed to be inadequate to draw the armature back against the pole piece after they become separated (unless the polarity is reversed). Alternately, current flow could be interrupted through the winding 50 after a selected time period to prevent such armature "bounce back".

While the above description constitutes the preferred embodiments of the present invention, it will be appreciated that the invention is susceptible to modification, variation and change without departing from the proper scope and fair meaning of the accompanying claims.

What is claimed is:

1. A bistable actuating solenoid comprising:
    a solenoid winding defining an elongated cylindrical cavity,
    an armature disposed in said winding cavity, said armature being translatable in said cavity between first and second positions,
    a remote latching mechanism actuatable between a first condition and a second condition,
    coupling means for mechanically joining said solenoid armature to said remote latching mechanism whereby when said armature is in said first position, said latching mechanism is in said first condition, and when said armature is in said second position, said remote latching mechanism is in said second condition,
    permanent magnet means for providing a magnetic field and for holding said armature in said first position, and spring means for urging said armature to said second position and for holding said armature at said second position, wherein when said armature is in said first position, said armature may be moved to said second position by passing current through said winding in a manner that produces a magnetic field having a polarity which opposes the field presented by said permanent magnet thereby cancelling the attracting force of said armature to said permanent magnet and releasing said armature to move to said second position under the influence of said spring means, and wherein said armature may be moved from said second position to said first position by passing current through said winding in a manner that produces a magnetic field having a polarity which combines with the field presented by said permanent magnet to attract said armature to said first position, wherein said permanent magnet thereafter holds said armature in said first position when no current is passing through said winding.

2. The bistable actuating solenoid according to claim 1 wherein said solenoid is used for actuating an automobile fuel filler door locking system, comprising:
 a locking mechanism actuatable between locked and unlocked conditions, and
 a flexible cable coupled to said solenoid armature and to said locking mechanism, wherein movement of said armature between said first and second positions actuates said locking mechanism between said locked and unlocked conditions.

3. The bistable actuating solenoid according to claim 1 further comprising a frame member having first and second upstanding tabs, said first tab positioned in contact with said permanent magnet and said second tab separated from said first tab and generally surrounding said winding.

4. The bistable actuating solenoid according to claim 1 wherein said spring means comprises a coil spring disposed between said permanent magnet and said armature.

5. The bistable actuating solenoid according to claim 1 further comprising a pole piece disposed in said winding cavity adjacent said permanent magnet.

6. The bistable actuating solenoid according to claim 5 wherein said pole piece and said armature define complementary and interfitting conical surfaces.

7. A fuel filler door locking system for a motor vehicle, comprising:
 a solenoid winding defining an elongated cylindrical cavity,
 an armature disposed in said winding cavity, said armature being linearly translatable in said cavity between first and second positions,
 permanent magnet means for providing a magnetic field and for holding said armature in said first position,
 spring means for urging said armature to said second position and for holding said armature at said second position, wherein when said armature is in said first position, said armature may be moved to said second position by passing current through said winding in a manner that produces a magnetic field having a polarity which opposes the field presented by said permanent magnet thereby cancelling the attracting force of said armature to said permanent magnet and releasing said armature to move to said second position under the influence of said spring means, and wherein said armature may be moved from said second position to said first position by passing current through said winding in a manner that produces a magnetic field having a polarity which combines with the field presented by said permanent magnet to attract said armature to said first position, wherein said permanent magnet thereafter holds said armature in said first position when no current is passing through said winding,
 a locking mechanism actuatable between conditions of locking and unlocking said fuel filler door, and
 a flexible cable coupled to said solenoid armature and to said locking mechanism, wherein movement of said armature between said first and second positions actuates said locking mechanism between said locking and unlocking conditions.

8. The fuel filler door locking system according to claim 7 further comprising a frame member having first and second upstanding tabs, said first tab positioned in contact with said permanent magnet and said second tab separated from said first tab and generally surrounding said winding.

9. The fuel filler door locking system according to claim 7 wherein said spring means comprises a coil spring disposed between said permanent magnet and said armature.

10. The fuel filler door locking system according to claim 7 further comprising a pole piece disposed in said winding cavity adjacent said permanent magnet.

11. The fuel filler door locking system according to claim 10 wherein said pole piece and said armature define complementary and interfitting conical surfaces.

12. A bistable actuating solenoid comprising:
 a bobbin in the form of an elongated tube with a hollow internal bore,
 a coil winding wrapped around said bobbin,
 an armature disposed in said bobbin bore and being axially translatable therein between first and second positions,
 a remote latching mechanism actuatable between a first condition and a second condition,
 coupling means for mechanically joining said solenoid armature to said remote latching mechanism whereby when said armature is in said first position, said latching mechanism is in said first condition, and when said armature is in said second position, said remote latching mechanism is in said second condition,
 a permanent magnet for providing a magnetic field and for holding said armature in said first position, said permanent magnet disposed at one end of said bobbin bore,
 an actuation cable affixed to one end of said armature,
 a frame member having first and second upstanding tabs, said tabs acting as flux collectors, said first tab trapping said magnet within said bobbin bore and said second tab separated from said first tab and generally surrounding said bobbin,
 spring means for urging said armature to said second position and for holding said armature at said second position, wherein when said armature is in said first position, said armature may be moved to said second position by passing current through said winding in a manner that produces a magnetic field having a polarity which opposes the field presented by said permanent magnet thereby cancelling the attracting force of said armature to said permanent magnet and releasing said armature to move to said second position under the influence of said spring means, and wherein said armature may be moved from said second position to said first position by passing current through said winding in a manner that produces a magnetic field having a polarity which combines with the field presented by said permanent magnet to attract said armature to said first position, wherein said permanent magnet thereafter holds said armature in said first position when no current is passing through said winding.

13. The bistable actuating solenoid according to claim 12 further comprising, a pole piece in close proximity with said magnet, said pole piece defining a first frusto-conical surface and said armature defining a second frusto-conical surface, said surfaces having complementary and interfitting configurations.

14. The bistable actuating solenoid according to claim 12 wherein said spring means comprises a coil spring disposed between said pole piece and said armature.

15. The bistable actuating solenoid according to claim 12 wherein said solenoid is used for actuating an automobile fuel filler door locking system, comprising:
a locking mechanism actuatable between locked and unlocked conditions, and
a flexible cable coupled to said solenoid armature and to said locking mechanism, wherein movement of said armature between said first and second positions actuates said locking mechanism between said locked and unlocked conditions.

16. A bistable actuating solenoid used for actuating an automobile fuel filler door locking mechanism, comprising:
a solenoid winding defining an elongated cylindrical cavity,
an armature disposed in said winding cavity, said armature being translatable in said cavity between first and second positions,
permanent magnet means for providing a magnetic field and for holding said armature in said first position,
spring means for urging said armature to said second position and for holding said armature at said second position, wherein when said armature is in said first position, said armature may be moved to said second position by passing current through said winding in a manner that produces a magnetic field having a polarity which opposes the field presented by said permanent magnet thereby cancelling the attracting force of said armature to said permanent magnet and releasing said armature to move to said second position under the influence of said spring means, and wherein said armature may be moved from said second position to said first position by passing current through said winding in a manner that produces a magnetic field having a polarity which combines with the field presented by said permanent magnet to attract said armature to said first position, wherein said permanent magnet thereafter holds said armature in said first position when no current is passing through said winding,
a locking mechanism actuatable between locked and unlocked conditions, and
a flexible cable coupled to said solenoid armature and said to locking mechanism, wherein movement of said armature between said first and second positions actuates said locking mechanism between said locked and unlocked conditions.

17. A bistable actuating solenoid used for actuating an automobile fuel filler door locking system, comprising:
a bobbin in the form of an elongated tube with a hollow internal bore,
a coil winding wrapped around said bobbin,
an armature disposed in said bobbin bore and being axially translatable therein between first and second positions,
a permanent magnet for providing a magnetic field and for holding said armature in said first position, said permanent magnet disposed at one end of said bobbin bore,
a frame member having first and second upstanding tabs, said tabs acting as flux collectors, said first tab trapping said magnet within said bobbin bore and said second tab separated from said first tab and generally surrounding said bobbin,
spring means for urging said armature to said second position and for holding said armature at said second position, wherein when said armature is in said first position, said armature may be moved to said second position by passing current through said winding in a manner that produces a magnetic field having a polarity which opposes the field presented by said permanent magnet thereby cancelling the attracting force of said armature to said permanent magnet and releasing said armature to move to said second position under the influence of said spring means, and wherein said armature may be moved from said second position to said first position by passing current through said winding in a manner that produces a magnetic field having a polarity which combines with the field presented by said permanent to attract said armature to said first position, wherein said permanent magnet thereafter holds said armature in said first position when no current is passing through said winding,
a locking mechanism actuatable between locked and unlocked conditions, and
a flexible cable coupled to said solenoid armature and to said locking mechanism, wherein movement of armature between said first and second positions actuates said locking mechanism between said locked and unlocked conditions.

18. A bistable actuating solenoid, comprising:
a solenoid winding defining an elongated cylindrical cavity,
an armature disposed in said winding cavity, said armature being translatable in said cavity between first and second positions,
permanent magnet means for providing a magnetic field and for holding armature in said first position,
spring means for urging said armature to said second position and for holding said armature at said second position, wherein when said armature is in said first position, said armature may be moved to said second position by passing current through said winding in a manner that produces a magnetic field having a polarity which opposes the field presented by said permanent magnet thereby cancelling the attracting force of said armature to said permanent magnet and releasing said armature to move to said second position under the influence of said spring means, and wherein said armature may be moved from said second position to said first position by passing current through said winding in a manner that produces a magnetic field having a polarity which combines with the field presented by said permanent magnet to attract said armature to said first position, wherein said permanent magnet thereafter holds said armature in said first position when no current is passing through said winding, and manual actuation means coupled to said armature for moving said armature from said first position to said second position and from said second position to said first position.

19. The bistable actuating solenoid according to claim 16 further comprising a frame member having first and second upstanding tabs, said first tab positioned in contact with said permanent magnet and said second tab separated from said first tab and generally surrounding said winding.

20. The bistable actuating solenoid according to claim 16 wherein said spring means comprises a coil spring disposed between said permanent magnet and said armature.

21. The bistable actuating solenoid according to claim 16 further comprising a pole piece disposed in said winding cavity adjacent said permanent magnet.

22. The bistable actuating solenoid according to claim 18 wherein said pole piece and said armature define complimentary and interfitting conical surfaces.

23. The bistable actuating solenoid according to claim 16 wherein said manual actuating means comprises said armature having an annular groove therein, and a handle engaging said groove for manually moving said armature between said first and said second positions.

* * * * *

UNITED STATES PATENT AND TRADEMARK OFFICE
CERTIFICATE OF CORRECTION

PATENT NO. : 4,758,811

DATED : July 19, 1988

INVENTOR(S) : Michael Slavin et al.

It is certified that error appears in the above-identified patent and that said Letters Patent is hereby corrected as shown below:

Column 7, line 63, claim 16, "said to" should be --to said--.

Column 8, line 32, claim 17, after "permanent", insert --magnet--.

Signed and Sealed this

Thirteenth Day of December, 1988

Attest:

DONALD J. QUIGG

*Attesting Officer*       *Commissioner of Patents and Trademarks*